J. MONTGOMERY.
METAL SHAFT FOR MARINE ENGINES, AXLES, &c.
No. 13,339.  Patented July 24, 1855.
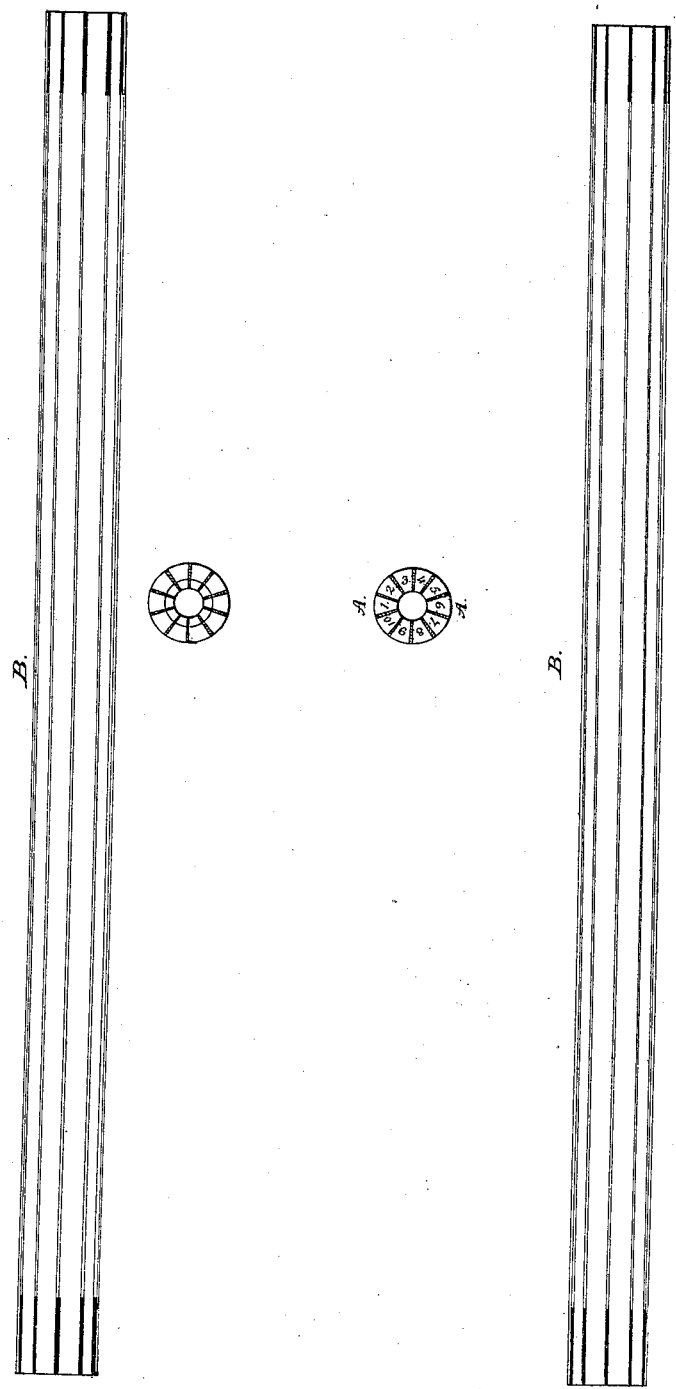

UNITED STATES PATENT OFFICE.

JAMES MONTGOMERY, OF BALTIMORE, MARYLAND.

WROUGHT-IRON SHAFT.

Specification of Letters Patent No. 13,339, dated July 24, 1855.

*To all whom it may concern:*

Be it know that I, JAMES MONTGOMERY, of the city of Baltimore, Maryland, have invented a new and useful Shaft for Steam Machinery, for Railroad-Axles, and for all Similar Purposes.

The following is a full and exact description: Having rolled any desirable number of separate iron bars, of the form shown in the accompanying drawings at A, they are put together as there represented by the separate bars, 1, 2, 3, 4, 5, 6, 7, 8, 9, 10, with suitable pieces of thin, wedge-shaped, rolled iron placed between them, at the two ends, and at such other part of the shaft as may be designed for the bearing. Strong iron withes are now firmly twisted around the bundle, and the whole mass is swung from a crane, in such manner, that the parts where wedges are inserted may be placed in the fire, and subjected to a welding heat. A piece of cold cast iron, of conical shape, is inserted in the central hollow to preserve the due shape of the same, when the heated part is swung on to an anvil having a hollow face, of the shape required for the shaft; a trip hammer, with a corresponding face, is brought to bear upon the heated mass, and by a series of rapid blows, welds the bars and wedges firmly together. The conical plug of cast iron is easily struck out; and this operation being repeated whereon the welding is required for bearings, the shaft is completed.

This hollow, skeleton, or compound shaft, formed of rolled bars, separate and distinct through the greater part of their length, but welded into a solid and substantial cylinder at the parts required for bearings, is represented by the figure B, and has many important advantages over the solid wrought shaft in common use. First, it saves at least one half the metal required; second, a better quality of metal is produced by the rolling in separate bars, and by the welding at the bearings; third, it is much easier to make and handle large shafts, by the mode described, than by the usual process of forging them in solid form; fourth, the compound, skeleton shaft has greater strength and elasticity for resisting all kinds of shocks and strains, than any solid shaft of the same diameter; lastly, the heat generated by friction will more readily escape, so as to keep down the temperature of the metal at the bearings.

I sometimes propose, for the purpose of still further economizing metal, and disposing the strength at the points of greatest strain, to roll the bars so that they shall taper and diminish, in shafts designed for steamers, from the inner to the outer end, preserving the same diameter externally; while, internally, the metal is gradually reduced, at the outer end, to about one half its volume at the opposite end. In railroad axles, I propose to modify this principle, so as to reduce the size of the bars, internally as before, but diminishing gradually from each end to the center of the axle.

I propose to roll these tapering bars of any desirable form, by means of suitable indentations on the surface of large rolls, which shall have their circumference equal to the length of the bar required.

What I claim as my invention and desire to secure by Letters Patent, is—

The construction of a hollow, compound shaft, by means of the bars and wedges, arranged and welded together only at the journals or bearings, as above described, while the bars are separated by sufficient spaces at all other parts, in the manner, and for the purposes, substantially hereinbefore described.

JAMES MONTGOMERY.

Witnesses:
FRED. I. STANTON,
N. CALLAN.